United States Patent [19]

Matovich

[11] 4,042,334

[45] Aug. 16, 1977

[54] HIGH TEMPERATURE CHEMICAL REACTOR

[75] Inventor: Edwin Matovich, Brea, Calif.

[73] Assignee: Thagard Technology Company, Irvine, Calif.

[21] Appl. No.: 591,950

[22] Filed: June 30, 1975

Related U.S. Application Data

[62] Division of Ser. No. 271,560, July 13, 1972, Pat. No. 3,933,434.

[51] Int. Cl.$^2$ .............................................. B01J 1/00
[52] U.S. Cl. ............................ 23/252 R; 48/DIG. 5; 423/659; 250/527; 250/432 R; 23/277 R; 23/284; 23/259.5; 432/238; 219/354; 219/121 L; 260/696; 201/25
[58] Field of Search ................. 23/252 R, 284, 277 R, 23/259.5; 48/DIG. 5; 250/527, 428; 219/121 L, 121 LM, 10.65, 10.55; 331/DIG. 1

[56] References Cited

U.S. PATENT DOCUMENTS 3,377,137  4/1968  Latham, Jr. .................. 23/259.5 X
3,719,454  3/1973  Jer-Yu Shang ..................... 23/252

OTHER PUBLICATIONS

J. E. Taylor et al. Journal of the Amer. Chem. Soc. 91:9, Apr. 23, 1969, pp. 2215-2219.

Hogg et al. "Masers & Lasers", Cambridge, Mass. pp. 167–171, copyright date 1962.

Primary Examiner—James H. Tayman, Jr.
Attorney, Agent, or Firm—Pennie & Edmonds

[57] ABSTRACT

A high temperature reactor comprises a tube which defines a reactor chamber; means for introducing the inert fluid into the reactor tube to provide a protective blanket for the inside surface of the tube; means for introducing reactants into the chamber, the reactants being confined centrally within the chamber by the protective blanket; and, means for generating high intensity radiant energy which is directed into the chamber to coincide with at least a portion of the path of the reactants.

18 Claims, 8 Drawing Figures

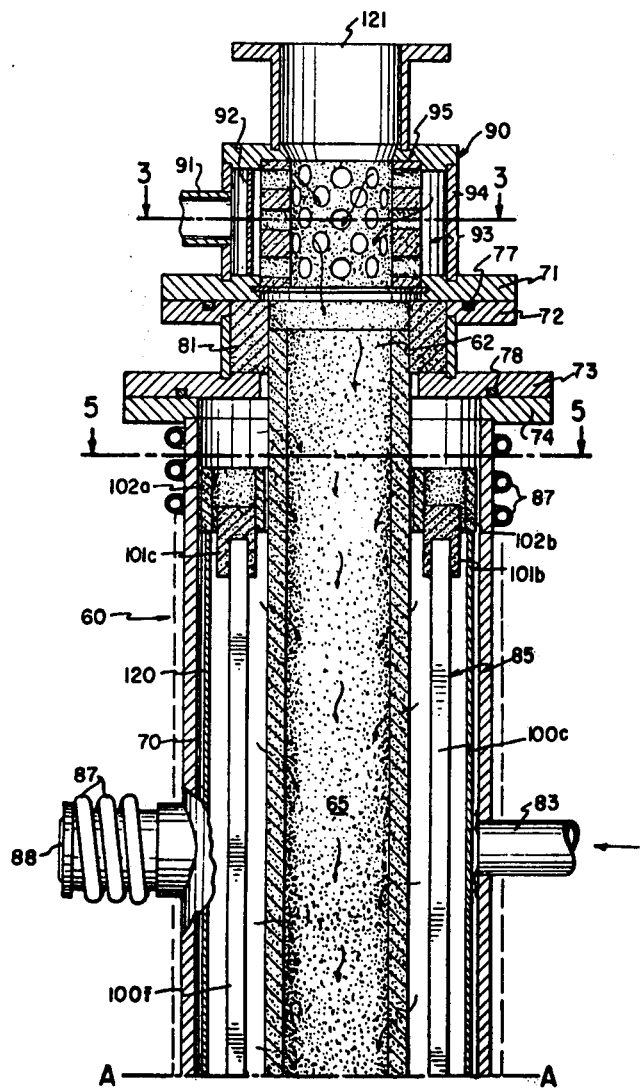

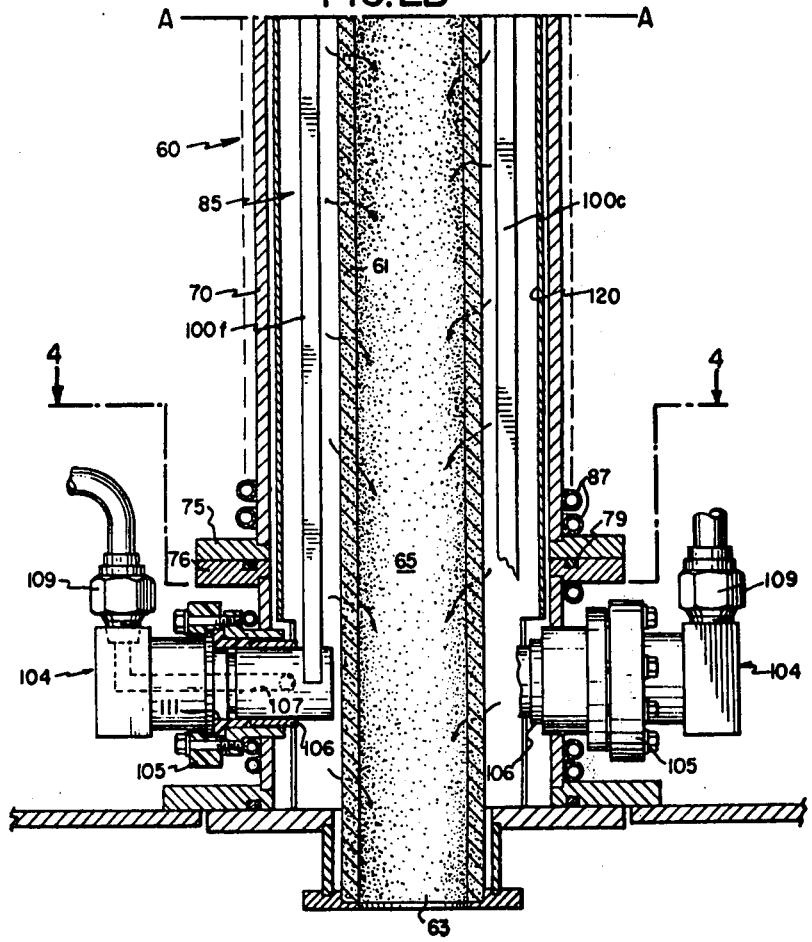

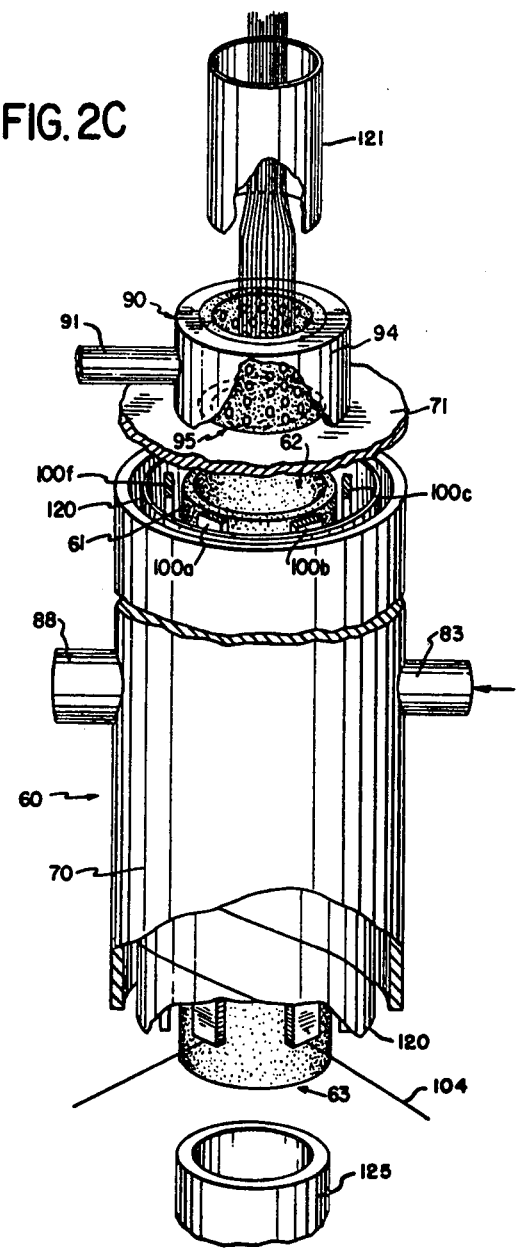

HIGH TEMPERATURE CHEMICAL REACTOR

CROSS-REFERENCE TO RELATED APPLICATION

This application is a division of my co-pending application Ser. No. 271,560, filed July 13, 1972, now U.S. Pat. No. 3,933,434.

BACKGROUND OF THE INVENTION

The present invention relates generally to a high temperature process which enables the carrying out of a myriad of chemical reactions many of which heretofore have been impractical or only theoretically possible. The present invention further relates to a reactor for carrying out the process of the invention. Both the process and the reactor utilize radiation coupling as a heat source and maintain the contemplated chemical reactions in isolation within a protective fluid blanket or envelope out of contact with the containing surfaces of the reactor.

High temperature reactions are presently employed to carry out pyrolysis, thermolysis, disassociation, decomposition and combustion reactions of both organic and inorganic compounds. Such reactors transfer heat to the reactants by convection and/or conduction but this characteristic inherently produces two major problems which limit the nature and scope of the reactions which may be carried out. Both problems result from the fact that in a conventional reactor which transfers heat to the reactants by convection, the highest temperature in the system is necessarily at the interface between the inside wall of the reactor and the reactant stream.

The first problem involves the limitations on available temperatures of reaction which are imposed by the strength at elevated temperatures of known reactor wall materials. The decreasing capability of such materials to maintain their integrity under conditions of increasing temperature is, of course, well known. However, since it is necessary that such materials be heated in order that thermal energy may be transferred to the reactant stream, available reaction temperatures have been limited by the temperature to which the reactor wall could be safely heated. This factor is particularly critical in cases where the contemplated reaction either must take place at or produces high pressures.

The second problem inherently results both because the wall of a conventional reactor is at the highest temperature in the system and because convective/conductive heat transfer requires contact between the wall and the reactant stream. Being at such elevated temperature, the reactor wall is an ideal if not the most desirable reaction site in the system and, in many instances, reaction products will accumulate and build up on the wall. Such build-up impairs the ability of the system to transfer heat to the reactants and this ever increasing thermal impedance requires the source temperature to be raised progressively just to maintain the initial rate of heat transfer into the reactant stream. Obviously, as the build-up increases, the required source temperature will eventually exceed the capabilities of the reactor wall material. Moreover, as additional energy is required to sustain the reaction, the process becomes less efficient in both the technical and economic sense. Thus, at the point where the contemplated reaction can no longer be sustained on the basis of either heat transfer, strength of materials, or economic considerations, the system must be shut down and cleaned.

Usually, cleaning is performed mechanically by scraping the reactor wall or chemically by burning off the deposits. In some continuous processes, it has been attempted to scrape the reactor wall while the reaction proceeds. However, the scraping tool itself necessarily gets hot, becomes a reaction site and, thereafter, must be cleaned. In any event, this down time represents a substantial economic loss. In many instances, a second system will be installed in order to minimize lost production time. However, such additional equipment generally represents a substantial capital investment.

U.S. Pat. No. 2,926,073 discloses a reactor which is designed to produce carbon black and hydrogen by the pyrolysis of natural gas. The process is stated to be continuous but, in practice, the convective heat transfer principle under which the reactor operates causes serious problems both in sustaining and controlling the reaction. Since the heated tubes of the reactor are ideal reaction sites, carbon invariably builds up and eventually clogs the system. More serious, however, is the problem of thermal runaway which can result in explosions. With respect to this condition, it has been determined that during pyrolysis of natural gas, thermal conductivity of the gas phase suddenly increases from about five to thirty times, depending upon the composition of the gas. Because the temperatures in a conventional convective reactor cannot be regulated with sufficient speed and accuracy to compensate for this phenomenon, in some instances the system would become unstable and explosions would result. Such conditions are inherent in conventional reactors and, as yet, no way has been found to overcome this problem.

U.S. Pat. No. 3,565,766 represents a recent attempt to upgrade coal by pyrolysis. The disclosed system comprises a series of hollow steel vessels which act as multistage fluidized beds at successively increasing temperatures up to about 1600° F. Fluidization at lower temperatures is achieved by an inert gas which may itself supply heat although external heating is contemplated. At higher temperatures, fluidization is achieved by the overhead gas obtained in the final stage; and, in the final stage, temperature is maintained by internal combustion of the char in air or oxygen. Because it relies primarily upon heat transfer by convection, this system is subject to many of the defects and disadvantages which have previously been discussed.

SUMMARY OF THE INVENTION

In the present high temperature chemical reaction process, an annular envelope of an inert fluid which is substantially transparent to radiation is generated; the envelope has a substantial axial length. Next, at least one reactant is passed through the core of the envelope along a predetermined path which is substantially coincident with the envelope axis, the reactants being confined within the envelope. After the reactant flow has started, high intensity radiant energy is directed through the envelope to coincide with at least a portion of the path of the reactants. Sufficient radiant energy is absorbed in the core to raise the temperature of the reactants to a level required to initiate the desired chemical reaction.

In the event that the reactants are themselves transparent to radiant energy, an absorptive target is introduced into the reactant stream. The target will absorb sufficient radiant energy to raise the temperature in the core to the desired level. In some instances, however, while the reactants are transparent to radiation, one or more of the reaction products will be an absorber. In such event, once the reaction has been initiated the target may be withdrawn and the reaction will continue. An example of such reaction is the pyrolysis of methane to carbon and hydrogen.

Some reactions will reverse either partially or completely if the reaction products are not cooled immediately and rapidly. In such cases, it is further contemplated that cooling of reaction products and any remaining targets to prevent such undesired chemical reactions, preferably by radiation heat transfer, be carried out immediately upon completion of the desired reaction.

The high temperature reactor of the present invention transfers substantially all of the required heat to the reactants by radiation coupling. The reactor comprises a tube having inlet end and an outlet end, the interior of the tube defining a reactor chamber. Means for introducing an inert fluid into the reactor chamber provide a protective blanket for the radially inward surface of the reactor tube. Means for introducing at least one reactant into the reactor chamber through the inlet end cause such reactants to be directed in a predetermined path axially of the reactor tube. The inert fluid blanket confines the reactants substantially centrally within the reactor chamber and out of contact with the reactor tube. High intensity radiant energy is generated and directed into the reactor chamber to coincide with at least a portion of the path of the reactants, sufficient radiant energy being absorbed to raise the temperature of the reactants to a level required to initiate the desired chemical reaction.

In contrast to the conventional convective reactors, the present invention relies upon radiation coupling to transfer heat to the reactant stream. The amount of heat transferred is independent both of physical contact between the reactor wall and the stream and of the degree of turbulent mixing in the stream. The primary consideration for heat transfer in the present system is the radiation absorption coefficient ($\alpha$) of the reactants. The inert fluid blanket which protects the reactor wall is desirably substantially transparent to radiation and thus exhibits a very low value of $\alpha$. This enables radiant energy to be transferred through the blanket to the reactant stream with little or no energy losses. Ideally, the reactants themselves or the target medium will exhibit high $\alpha$ values and will thus absorb large amounts of energy. Since materials which are good absorbers are generally good emitters of radiation, when the reactants or targets are raised to a sufficiently high temperature, they become secondary radiators which re-radiate energy throughout the entire reacting volume and further enhance the heat transfer characteristics of the system. This occurs almost instantaneously and is subject to precise and rapid control. Thus, in the process and apparatus of the present invention, the reacting core may be raised to extremely high temperatures while the protective blanket remains relatively cool. Moreover, the re-radiation phenomenon which ensures rapid and uniform heating of the reactants is completely independent of the degree of turbulent mixing which may exist in the reactant stream.

The present high temperature chemical process and apparatus provided a solution to problems which have plagued the art and thus permit the carrying out of reactions which heretofore have been impractical or only theoretically possible. Because heat is supplied by radiation coupling rather than by convection and/or conduction, the temperature of the reactant stream may be independent of both the temperature of the reactor wall and of the condition of the reactant stream, and the serious strength of materials problem is overcome. Two embodiments of the present reactor contemplate that the reactor wall in fact be cooled and a third embodiment, although it provides a heated wall as a source of radiant energy, is not subjected to the high pressures which are normally attendant to many kinds of reactions. For this reason, refractory materials such as carbon or thorium oxide, which are not suitable for use as a wall material in a conventional reactor, may be successfully employed. As compared to the most temperature-resistant alloys which melt at about 1600° C., thorium oxide, for example, is servicable at temperatures greater than 3000° C. This feature permits reaction temperatures far in excess of those presently achievable and reactions which had been only theoretically feasible may be carried out.

Moreover, the provision of the protective inert fluid blanket, which is made possible by the use of radiation coupling, isolates the reactor wall from the reactant stream and makes it impossible under normal operating conditions for any precipitates or other deposits to accumulate and clog the system.

The use of radiation coupling further provides accurate and almost instantaneous control of heat transfer rates which is impossible to achieve in a conventional convective reactor. Furthermore, the present reactor may provide a power density at the reaction site in excess of 10,000 watts/cm$^2$. The embodiment which is most suitable for large scale commercial purposes has achieved a power density of about 180 watts/cm$^2$. Even this lower figure represents a great improvement over the 2-3 watts/cm$^2$ which is ordinarily obtained in conventional reactors.

The reactions which may be carried out by the process of this invention as implemented by the present reactor are many and varied. For example, organic compounds, particularly hydrocarbons, may be pyrolized to produce carbon and hydrogen without the attendant build-up and thermal runaway problems which were encountered in the prior art. Saturated hydrocarbons may be partially pyrolized to obtain unsaturated hydrocarbons; thus, for example, propane and ethane may be dehydrogenated to propylene and ethylene, respectively. Unsaturated hydrocarbons may be partially pyrolized in the presence of hydrogen to form saturated hydrocarbons and, more specifically, petroleum products may be thermally cracked. Thus, gas oil may be readily converted into diesel oil, kerosene, gasoline fractions or even methane. Halogen intermediates may be added to partially pyrolized hydrocarbons to produce higher molecular weight compounds. Hydrocarbons may be completely or incompletely pyrolized in the presence of steam to form carbon monoxide and hydrogen; additional hydrogen may then be added and the reaction carried out to form alkane series hydrocarbons which are high BTU-value fuel gases.

Inorganic compounds may likewise be pyrolized. For example, salts or oxides of iron, mercury, silver, tungsten and tantalum, among others, may be disassociated to obtain pure metals. Oxides of iron, nickel, cobalt, copper and silver, to name a few, may be directly reduced in the presence of hydrogen with the same result. This list is by no means intended to be exhaustive.

Novel composite products may also be produced by the present process. For example, carbon or talc particles coated with silicon carbide may be obtained. This product serves as an excellent abrasive because as it is used, it continually breaks up and forms fresh new sharp surfaces. Particles of certain elements such as $U^{235}$ may also be encapsulated in a chemically-tight envelope of another material such as carbon; this particular product is useful as a nuclear reactor fuel element.

It is further contemplated that the present invention may provide the terminal step in conventional aerobic incineration of waste such as garbage and sewage. The relatively low temperatures encountered in current incineration processing techniques permit the formation of organic peroxides and oxides of nitrogen which are major contributors to photochemical smog and other forms of air pollution. Because such compounds are not stable at the higher processing temperatures afforded by the present invention, a waste incineration effluent which is very low in pollutants may be obtained.

Further, the present invention contemplates the high temperature anaerobic destructive distillation and/or disassociation of waste to yield useful products such as carbon black, activated charcoal, hydrogen, and glass cullet, to name a few. The addition of steam to such waste will produce carbon monoxide and hydrogen which may then be processed in the conventional manner to obtain fuel gases. Finally, the addition of hydrogen to such waste will produce petroleum-equivalent heavy oils and other petroleum products. Thus, substantial reductions in air pollution as well as significant economic gains may be realized through such contemplated applications of the present invention.

The present invention represents a major breakthrough in the art. Because it makes available for the first time a source of thermal energy which has never been harnessed in this manner, its potential applications are numerous and varied. Moreover, in surmounting the strength of materials problem which has shackled the art for many years, this invention makes possible in the practical sense many useful chemical reactions which have long been known but which could not been performed because of temperature limitations inherent in reactors which depended upon convective and/or conductive heat transfer.

BRIEF DESCRIPTION OF THE DRAWINGS

FIG. 2A is an elevation in section of the inlet end of a second embodiment of the reactor of the present invention;

FIG. 2B is an elevation in section of the outlet end of the second embodiment of the reactor of the present invention; FIGS. 2A and 2B represent halves of an integral structure which has been divided along line A—A in order to provide an illustration of sufficient size to show clearly certain structural details;

FIG. 2C is a perspective in partial section of the second embodiment of the reactor of the present invention wherein certain elements have either been removed or illustrated diagrammatically to illustrate more clearly the operation of the reactor;

DESCRIPTION OF THE PREFERRED EMBODIMENTS

Figure 1:
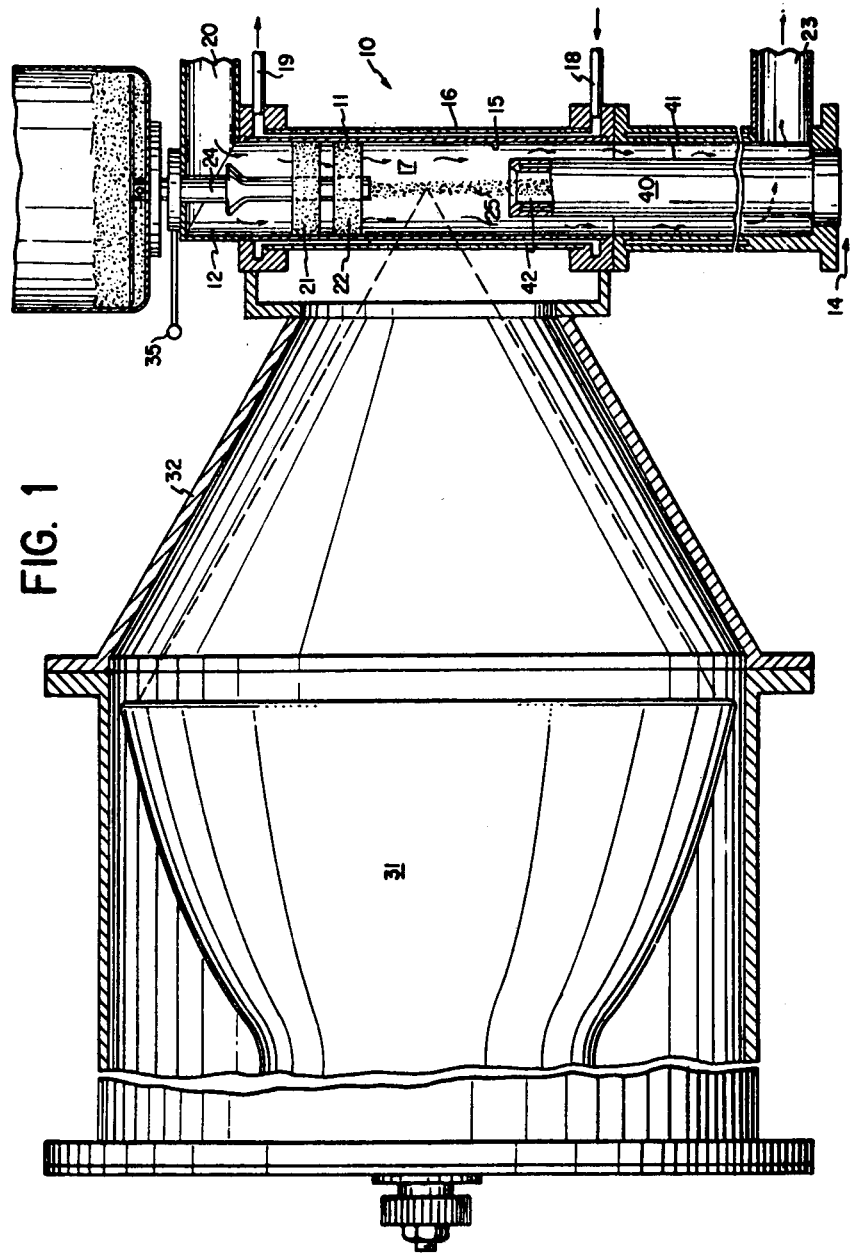
FIG. 1 is an elevation in partial section of one embodiment of the reactor of the present invention.

Referring specifically to FIG. 1, a first embodiment of the present high-temperature chemical reactor 10 comprises a reactor tube 11 which has an inlet end 12 and an outlet end 14. The reactor tube 11 includes an inner wall 15 and an outer wall 16 which define an annular channel therebetween and the interior of the tube 11 constitutes a reactor chamber 17. The tube 11 is made of a material which is substantially transparent to radiation. Suitable materials of this nature which exhibit a very low absorption coefficient ($\alpha$) include glass, quartz, hot sintered aluminum oxide, hot sintered yttrium oxide, pyrex (a borosilicate glass), vycor (a silicate glass) and sapphire; organic polymers such as plexiglass (acrylic), lucite (acrylic), polyethylene, polypropylene and polystyrene; and, inorganic salts such as the halides of sodium, potassium, cesium, lithium or lead.

As used herein, the term "radiation" is intended to encompass all forms of radiation including high-energy or impacting nuclear particles. However, because the practical use of such radiation is not possible under the present state of the art, black body or other electromagnetic radiation, particularly of wavelengths ranging from about 100 microns to 0.01 microns, is considered to be the primary energy source upon which design considerations are to be based.

During operation of the reactor 10 a fluid medium which is substantially transparent to radiation is introduced through inlet 18, circulates throughout the annular channel to cool the reactor tube 11 and exits through outlet 19. Such fluid medium may be a gas or a liquid; representative suitable fluids which have low coefficients of absorption ($\alpha$) include liquid or gaseous water, heavy water, nitrogen, oxygen and air.

Means for introducing an inert fluid into the reactor chamber 17 through an inlet 20 comprises first and second laminar diffusers 21 and 22, respectively, which are disposed adjacent the inlet end 12 of the tube 11. Such diffusers 21, 22 may be in the form of honeycomb cores or any other suitable configuration which causes a fluid directed under pressure therethrough to flow in a substantially laminar fashion. The inert fluid is thus introduced substantially axially into the reactor chamber 17 to provide a protective blanket for the radially inward surface of the reactor tube 11 and is collected for recirculation as it exits through outlet 23. The inert fluid is substantially transparent to radiation in that it has a low $\alpha$ value. Fluids which are suitable for this purpose include simple gases such as helium, neon, argon, krypton, and xenon; complex gases which do not decompose to form a solid product such as hydrogen, nitrogen, oxygen and ammonia; and, liquid or gaseous water. The term "inert" as used herein, involves two factors: the ability of the fluid to react chemically with the material of the reactor tube 11 and the ability of the fluid to react chemically with the materials which are being processed. Thus, the selection of an "inert" blanket fluid depends in each instance upon the particular environment. It is always desirable that the fluid be inert with respect to the reactor tube and it is usually desirable that the fluid be inert with respect to the reaction which is carried out. However, it is contemplated that in some instances the blanket fluid shall also participate in the reaction as, for example, where iron or carbon particles are reacted in the presence of a steam blanket to produce iron oxide and hydrogen or carbon monoxide and hydrogen, respectively.

Reactants are introduced into the reactor chamber 17 through an inlet 24 at the inlet end 12 of the reactor tube 11. The reactants are directed along a predetermined path 25 axially of the reactor tube 11 and are confined by the protective inert fluid blanket substantially centrally within the reactor chamber 17 out of contact with the reactor tube 11.

A high-intensity radiant energy source (not shown) is disposed within a polished reflector 31 which is mounted on a frame 32 externally of the reactor tube 11. The radiant energy source may be a plasma arc, a heated filament, a seeded flame, a pulsed flashlamp or other suitable means; a laser may also serve as the source but, at present, laser technology has not been sufficiently developed to the extent where it is economically practical for the purposes contemplated by the present invention. The radiant energy generated by the source is collected by the reflector 31 and is directed through the tube 11 into the reactor chamber 17 to coincide with at least a portion of the path 25 of the reactants. Sufficient radiant energy will thus be absorbed to raise the temperature of the reactants to a level required to initiate and carry out the desired chemical reaction. As previously stated, the tube 11, the cooling fluid and the inert blanket are all substantially transparent to radiant energy. Accordingly, they do not interfere to any great extent with transmission of energy to the reactant steam and remain relatively cool. Thus, the reactor tube 11 is not subjected to appreciable thermal stress and remains free from precipitates and other deposits which would normally accumulate.

The above discussion presumes that the reactants themselves exhibit a relatively high radiation absorption coefficient ($\alpha$). However, if such is not the case, a radiant energy absorptive target must be introduced into the reactor chamber 17 coincident with at least one point along the path 25 of the reactants. In the embodiment of FIG. 1, the target medium is a finely divided solid such as carbon powder or other suitable material which enters the reactor chamber 17 together with reactants through inlet 24 and absorbs sufficient radiant energy to raise the temperature of the reactants to the required level.

Alternatively, the target may be a liquid such as tar, asphalt, linseed oil or diesel oil, and may include solutions, dispersions, gels and suspensions of varied makeup which may be readily selected from available materials to suit particular requirements. The target may be a gas which preferably exhibits absorption in the electromagnetic spectrum from about 100 microns to about 0.01 microns; such gases include ethylene, propylene, oxides of nitrogen, bromine, chlorine, iodine, and ethyl bromide. The target may also be a solid element made of material such as carbon which is disposed in the reactor chamber 17 along at least a portion of the path 25 of the reactants.

Other means for raising the temperature of the reaction to the required level may include an electrically heated element, an electric arc or a flame disposed within the reactor chamber 17 coincident with at least a portion of the path 25 of the reactants. In such instances, the initiating heat source is self-contained and is not derived from the radiant energy generating means. Such means are particularly useful where the reactants themselves are transparent to radiation but at least one of the reaction products is an absorber. Thus, once the contemplated reaction has been initiated, the temperature raising means may be deactivated because the reaction products will absorb sufficient radiant energy to sustain the reaction. Likewise, if a target medium is used, it may be discontinued or withdrawn once the reaction has begun as by operation of a control means 35. An example of a reaction where a target or other initiating means is required only at the outset is the pyrolysis of methane to produce carbon and hydrogen.

As previously stated, some reactions will reverse either partially or completely if the reaction products are not cooled immediately and rapidly. For this purpose, reaction product cooling means 40 may be provided within the reactor chamber 17 adjacent the outlet end 14 of the reactor tube 11. One embodiment of such means 40 is disposed substantially centrally within the reactor chamber 17 and includes a tubular member 41 having an internal channel 42 through which is circulated a coolant such as water. The radially inward surface of the tube 41 is designed to constitute an absorber of radiant energy. As the reaction products, remaining reactants and targets, if any, pass within the cooled tube 41, heat is transferred rapidly by radiation coupling and the system is effectively quenched to prevent any further undesired chemical reactions.

Referring to FIGS. 2A-6, inclusive, and particularly to FIGS. 2A-2C, a second embodiment of the present reactor 60 comprises a reactor tube 61 having an inlet end 62 and an outlet end 63; the interior of the tube 61 defines a reactor chamber 65. The reactor tube 61 is made of a porous material which is capable of emitting radiant energy; preferably the pore diameter is in the range of about 0.001 to 0.020 inch to permit uniform flow of sufficient inert fluid through the tube wall to provide an adequate protective blanket. Other wall constructions such as mesh, screening or various types of perforations may also be used to provide the desired result. The reactor tube 61 may be made from materials such as graphite, carbon, sintered stainless steel, sintered tungsten, or sintered molybdenum, and inorganic materials such as oxides of thorium, magnesium, zinc, aluminum or zirconium, among others. Tungsten, nickel and molybdenum are also suitable for use as mesh or screening.

A fluid-tight, tubular pressure vessel 70 which is preferably made of stainless steel encloses the reactor tube 61. The integrity of the vessel 70 is maintained by a series of sealing flanges 71, 72; 73, 74; and 75, 76 which join the several sections of the reactor 60. Flanges 72, 73 and 76 further are grooved to receive stainless steel O-rings 77, 78 and 79, respectively, which act as pressure seals. The reactor tube 61 is slidably mounted at one end within a graphite sleeve 81 which allows for any elongation of the tube 61 which may occur during operation at elevated temperatures.

The pressure vessel 70 further includes an inlet 83 for admitting an inert fluid, which as in the case of the FIG. 1 embodiment, is substantially transparent to radiant energy. The inert fluid is first directed under pressure into a plenum 85 which is defined between the reactor tube 61 and the pressure vessel wall 70. Thereafter, such fluid is directed through the porous wall of the tube 61 into the reactor chamber 65 to constitute a protective blanket for the radially inward surface of the reactor tube 61.

Means for cooling the pressure vessel 70 comprises cooling coils 87 which are disposed about the radially outward surface of the pressure vessel 70. The coils 87 are preferably covered with a flame-sprayed aluminum coating which enhances the thermal contact between the vessel 70 and the coils 87 to increase cooling efficiency. Such coils 87 are also disposed about a viewport 88 which is provided in the pressure vessel wall.

Figure 3:
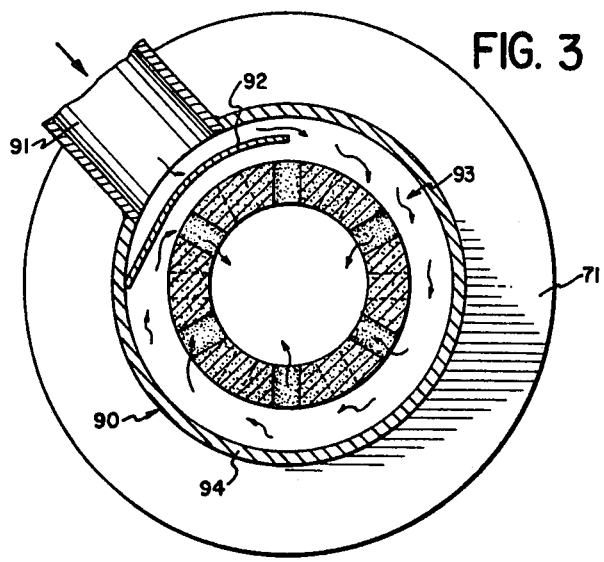
FIG. 3 is a section taken substantially along line 3—3 of FIG. 2A.

As shown best in FIGS. 2A and 3, the reactants are introduced into the reactor chamber 65 through the inlet end 62 of the reactor tube 61. Means for introducing the reactants comprises an inlet section 90 which is mounted in fluid-tight relationship by flanges 71, 72 adjacent the inlet end 62 of the tube 61. The reactants are carried in a gaseous stream through inlet 91, past a tangential baffle 92 and into a plenum 93 which is defined between an outer wall 94 and a diffuser 95. Suitable materials for the diffuser 95, whose function is to minimize turbulence in the stream, include porous carbon, steel wool and mesh screening. As in the case of FIG. 1 embodiment, the reactants are directed in a predetermined path axially of the reactor tube 61 and are confined by the protective blanket substantially centrally within the reactor chamber 65 and out of contact with the inner wall of the reactor tube.

Figure 4:
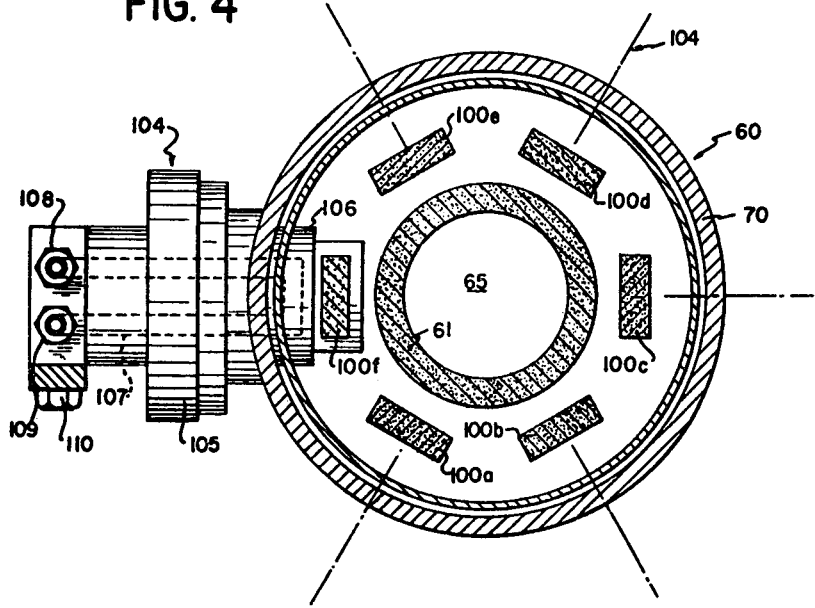
FIG. 4 is a section taken substantially along line 4—4 of FIG. 2B.
Figure 5:
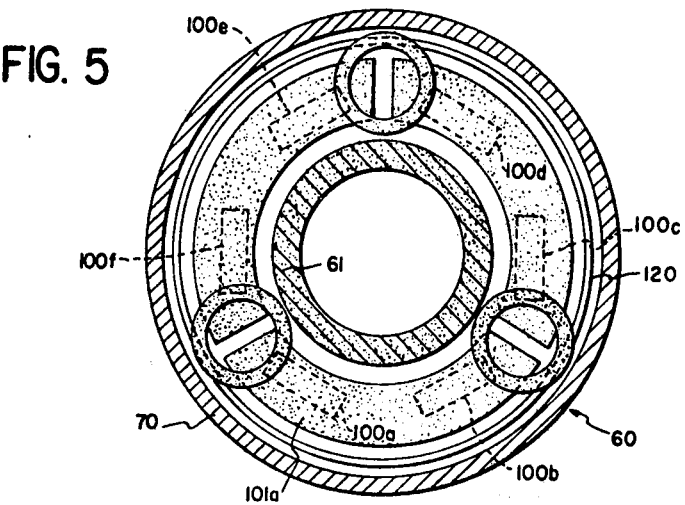
FIG. 5 is a section taken substantially along line 5—5 of FIG. 2A.
Figure 6:
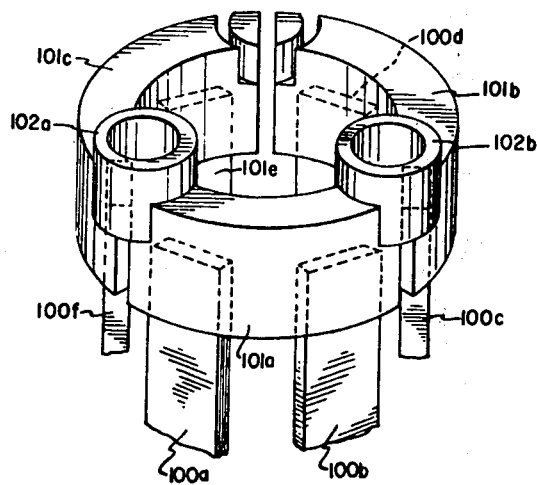
FIG. 6 is a perspective of a portion of the reactor tube heating means of the second embodiment of the present invention.

In the second embodiment, the reactor tube 61 itself generates the high-intensity radiant energy which is directed centrally therewithin substantially coincident with at least a portion of the path of the reactants. Heating is provided by a plurality of carbon electrodes 100a-100f which are disposed radially outwardly of and spaced circumferentially about the tube 61; the heat generated by the electrodes 100 is transferred to the tube 61 by radiation. In the second embodiment, as best shown in FIGS. 2A, 5 and 6, electrodes 100a and 100b, for example, are embedded at one end in an arcuate carbon cross-over element 101a; electrodes 100c and 100d are embedded in cross-over 101b; and, electrodes 100e and 100f are likewise embedded in cross-over 101c. Tubular alumina spacers 102a-102c have the dual function of centering the porous reactor tube 61 and of dividing the three circuits. Referring specifically to FIGS. 2B and 4, each carbon electrode 100a-100f is mounted at its other end in a copper bus bar electrode 104. Although there are six such electrodes 104, only one is actually shown in FIG. 4 as a matter of convenience. Each copper bus bar electrode 104 includes a phenolic flange 105 and a ceramic insulator 106. The electrode 104 is cooled by water which circulates in an internal channel 107, entering through inlet 108 and exiting through outlet 109. A high current electrical connection is illustrated at 110. A polytetrafluoroethylene seal 111 assists in preventing any leakage from the pressure vessel 70. The electrical system illustrated herein is particularly suitable for use with a three-phase power source. However, other systems may be used where circumstances warrant. It is further contemplated that the porous tube 61 may itself be heated directly by electrical resistance; in such event the electrodes 100 may be eliminated.

The thermal efficiency of the tube heating means is further improved by the provision of a molybdenum heat shield 120 which reflects electromagnetic radiation from the carbon electrodes 100 toward the porous tube 61. In that the heat shield 120 reflects rather than transfers heat, it functions as an insulator and may thus be made of any material which exhibits this characteristic and which can withstand the temperatures generated by the electrodes 100. The heat shield 120 is disposed within the pressure vessel 70 radially outwardly of the electrodes 100 and preferably comprises a flat strip of rectangular cross-section which is wound in a series of helical turns. Such construction allows the inert blanket gas to enter through the inlet 83 and to circulate freely thoughout the plenum 85.

As in the case of the FIG. 1 embodiment, a target medium or other initiating means may be provided if required. Target media are introduced into the reactor chamber 65 through an inlet 121. Also, reaction product cooling means 125 of a construction as previously described, or of any other suitable construction, may be provided to prevent any undesired chemical reactions which might occur if the reaction products were not cooled immediately after formation.

The primary advantage of the second embodiment over the first embodiment is that in the former, the inert fluid blanket is introduced into the chamber 65 in a radially inward direction whereas in the latter, the blanket is introduced axially into the chamber 17. It will be appreciated that laminar flow can be maintained for only relatively short distances before turbulence causes intermixing and destroys the integrity of the protective blanket. Because radial blanket introduction does not require laminar flow of the blanket fluid, much greater axial reactor chamber lengths may be obtained. All that need be done in the second embodiment is to maintain the absolute level of the inert fluid pressure greater than the absolute level of the pressure in the reactant stream in order to prevent any reactants and/or reaction products from impinging upon the reactor tube 61. This feature aids in making the second embodiment more suitable for large scale commercial operation.

A further distinction between the respective embodiments is that the reactor tube 11 of FIG. 1 is positively cooled whereas the tube 61 of FIG. 2 must be heated and may operate at temperatures in excess of 3000° C. as in the case where porous thorium oxide is the base material. Although the cool wall is better able to withstand pressure because it is not subject to thermal stress, the hot wall 61 is not subject to a pressure gradient, except perhaps the relatively small differential between the fluid blanket and the reactive stream. The pressure is borne by the stainless steel pressure vessel wall 70 which, of course, is cooled by the coils 87 and thus is not subject to thermal stress. Accordingly, a refractory material, such as carbon or thorium oxide, which can withstand temperatures far in excess of those tolerable by conventional reactor wall materials but which are unsuitable for use in a conventional convective reactor, may now be employed for the first time to provide a practical, ultra-high-temperature system.

The present invention further contemplates a third embodiment which combines features of the first two. Accordingly, the reactor tube may be constructed of a porous material which is substantially transparent to radiation. Suitable wall materials include for example porous quartz, porous glass frit, and porous sapphire. An inert fluid which is substantially transparent to radiation may thus be introduced into the reactor chamber radially inwardly through the porous reactor wall rather than axially in a laminar fashion as described with respect to the first embodiment. Radiant energy is generated, collected and directed into the reactor chamber also as described with respect to the first embodiment.

The third embodiment provides the higher power density of the first embodiment and the radially injected fluid blanket of the second embodiment. However, at the present stage of development, the second embodiment is the most suitable for large scale commercial applications since its radiant energy source is derived from ordinary electrical resistance heating. The second embodiment is therefore more readily capable of being serviced and maintained. Moreover, the second embodiment may be made to carry out all of the processes and reactions contemplated by the present invention merely by adjusting the residence time of the reactants within the reactor chamber to compensate for the lower power density.

The high temperature chemical reaction process of the present invention comprises the steps of generating an annular envelope or blanket of an inert fluid which is substantially transparent to radiation. The envelope has a substantial axial length. The annular envelope may be generated in a direction generally parallel to its axis or in a direction generally perpendicular to its axis and radially inwardly of its outer circumferential surface.

In the former instance, as previously described with respect to the first embodiment of the present reactor, the envelope fluid must be maintained in laminar flow to prevent intermixing with the reactant stream. This requirement imposes certain limitations upon the axial length of the envelope because such laminar flow, and thus blanket integrity, cannot be maintained for indefinite lengths downstream, especially if a particularly violent reaction is contemplated. Accordingly, this manner of generating the envelope is most suitable for smaller-scale and laboratory applications.

In the latter instance, as previously described with respect to the second and third embodiments of the present invention, the integrity of the fluid envelope is independent of any flow considerations and may be maintained for an axial distance much greater than that obtainable in the case of the axially injected laminar envelope. The primary requirement is to maintain the flow of the inert fluid under a greater pressure than that of the reactant stream to prevent the reactants from "punching through" or otherwise breaking out of confinement within the envelope.

After the envelope has been generated, at least one reactant is passed through its core along a predetermined path which is substantially coincident with the envelope axis. The envelope confines the reactants therewithin and out of contact with the containing surfaces of the reactor chamber.

Finally, high intensity radiant energy is directed into the envelope core to coincide with at least a portion of the predetermined path of the reactants. Such radiant energy may be directed to at least one point along the path of the reactants as in the first and third embodiments, or it may be directed along a finite length of the path as contemplated by the second embodiment. In either case, sufficient radiant energy is absorbed in the core to raise the temperature of the reactants to a level required to initiate the desired chemical reaction.

In the event that the reactants will not themselves absorb radiant energy, an absorptive target may be introduced along the path of the reactants, preferably before the radiant energy is directed into the core. The target will then absorb sufficient radiant energy to raise the temperature in the core to the level required to initiate the desired chemical reaction. As previously stated, if the contemplated reaction is such that the transparent reactants produce at least one product which absorbs radiant energy, the target may be deactivated after the reaction has been initiated.

The contemplated process may further include the step of cooling the reaction products and any remaining reactants and/or targets immediately after the desired reaction has been completed. The purpose of this procedure is to terminate the desired reaction and to prevent the occurence of any further undesired reaction. The products, targets and remaining reactants may be cooled conveniently and effectively by radiation heat transfer to a cool, radiant energy absorbing surface.

I claim:
1. A high temperature reactor wherein substantially all of the heat is supplied by radiation coupling comprising:
   a. a reactor tube having an inlet end and an outlet end, the interior of the tube defining a reactor chamber, the reactor tube being made of a material which is substantially transparent to radiation and including an inner wall and an outer wall which define an annular channel therebetween throughout which a fluid medium which is substantially transparent to radiation can be circulated to cool the reactor tube;
   b. a diffuser disposed adjacent the inlet end of the reactor tube through which an inert gas which is substantially transparent to radiation is directed under pressure, and thereafter in substantially laminar flow axially through the reactor chamber to provide a protective blanket for the inner wall of the reactor tube;
   c. means for introducing at least one reactant into the reactor chamber through the inlet end of the reactor tube in a predetermined path axially of the reactor tube, the reactants being confined substantially centrally within the reactor chamber and out of contact with the inner wall of the reactor tube by the protective blanket; and
   d. a radiant energy source located externally of the outer wall of the reactor tube and disposed within a reflector, the reflector being configured and positioned to focus radiant energy generated by the source to at least a portion of the predetermined path of the reactants within the reactor chamber.

2. A high temperature reactor wherein substantially all of the heat is supplied by radiation coupling comprising:
   a. a reactor tube having an inlet end and an outlet end, the interior of the tube defining a reactor chamber, the reactor tube being made of a porous material which is substantially transparent to radiation;
   b. means for introducing an inert fluid under pressure into the reactor chamber through the porous tube wall to constitute a protective blanket for the radially inward surface of the reactor tube, the inert fluid being substantially transparent to radiation;
   c. means for introducing at least one reactant into the reactor chamber through the inlet end of the reactor tube in a predetermined path axially of the reactor tube, the reactants being confined by the protective blanket substantially centrally within the reactor chamber and out of contact with the inner wall of the reactor tube; and
   d. a radiant energy source located externally of the reactor tube and disposed within a reflector, the reflector being configured and positioned to focus radiant energy generated by the source to at least a portion of the predetermined path of the reactants within the reactor chamber.

3. A reactor according to claim 2 further including means for introducing a radiant energy absorptive target into the reactor chamber coincident with at least one point along the path of the reactants which are transparent to radiant energy, sufficient radiant energy being absorbed by the target to raise the temperature of the reactants to a level required to initiate the desired chemical reaction.

4. A reactor according to claim 2 wherein the target is a liquid.

5. A reactor according to claim 2 wherein the target is a gas which exhibits absorption in the electromagnetic spectrum from about 100 microns to about 0.01 microns.

6. A reactor according to claim 2 wherein the target is finely divided carbon powder which is introduced through the inlet end of the reactor tube along a predetermined path coincident with the path of the reactants.

7. A reactor according to claim 2 wherein the target is a solid element which is disposed in the reactor chamber along at least a portion of the path of the reactants.

8. A reactor according to claim 7 wherein the solid element is made of carbon.

9. A reactor according to claim 2 further including means disposed within the reactor chamber coincident with at least a portion of the path of the reactants for raising the temperature of the reactants to a level required to initiate the desired chemical reaction.

10. A reactor according to claim 9 wherein the means for raising the temperature of the reactants comprises an electrically heated element.

11. A reactor according to claim 9 wherein the means for raising the temperature of the reactants comprises an electric arc.

12. A reactor according to claim 9 wherein the means for raising the temperature of the reactants comprises a flame.

13. A reactor according to claim 2 further including reaction product cooling means disposed substantially centrally within the reactor chamber adjacent the outlet end of the reactor tube.

14. A reactor according to claim 2 wherein the porous material is graphite, carbon, sintered stainless steel, sintered tungsten, or sintered molybdenum.

15. A reactor according to claim 2 wherein the porous material is thorium oxide, magnesium oxide, zinc oxide, aluminum oxide or zirconium oxide.

16. A reactor according to claim 2 further including means for cooling the pressure vessel.

17. A reactor according to claim 2 wherein the means for cooling the pressure vessel comprises cooling coils disposed about the outer surface of the pressure vessel.

18. A reactor according to claim 2 wherein the diameter of the pores in the reactor tube is in the range of about 0.001 to 0.020 inch.

* * * * *